(12) United States Patent
Mehrgardt

(10) Patent No.: US 10,057,790 B2
(45) Date of Patent: Aug. 21, 2018

(54) MEASUREMENT SYSTEM AND A METHOD

(71) Applicant: Rohde & Schwarz GmbH & Co. KG, München (DE)

(72) Inventor: Philip Mehrgardt, Zuchwil (CH)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 0 days.

(21) Appl. No.: 15/475,479

(22) Filed: Mar. 31, 2017

(65) Prior Publication Data

US 2018/0035312 A1 Feb. 1, 2018

(30) Foreign Application Priority Data

Jul. 29, 2016 (EP) .................................. 16181857

(51) Int. Cl.
  *H04B 1/10* (2006.01)
  *H04B 17/309* (2015.01)
  *H04W 24/08* (2009.01)
  *H04W 24/02* (2009.01)

(52) U.S. Cl.
  CPC ........... *H04W 24/02* (2013.01); *H04W 24/08* (2013.01)

(58) Field of Classification Search
  CPC .... H04W 24/02; H04W 24/08; H04B 1/1027; H04B 17/309; H04B 17/24; H04B 17/11
  See application file for complete search history.

(56) References Cited

U.S. PATENT DOCUMENTS 7,184,770 B1* 2/2007 Narasimhan .......... H04W 16/18
  455/423
2009/0023439 A1* 1/2009 Paul ...................... H04B 17/21
  455/423
2009/0215443 A1* 8/2009 Dickey ................. H04W 24/08
  455/424
2012/0028586 A1* 2/2012 Inaba .................. H04B 17/3912
  455/67.11
2012/0167203 A1* 6/2012 Lee ....................... G06F 19/366
  726/19
2014/0016487 A1 1/2014 Dorenbosch
  (Continued)

OTHER PUBLICATIONS

Extended European Search Report for European Application No. 16181857.0 (dated Jan. 30, 2017).

*Primary Examiner* — Andrew Wendell
(74) *Attorney, Agent, or Firm* — Shumaker & Sieffert, P.A.

(57) ABSTRACT

The present invention provides a measurement system (1, 21) and a method for measuring a connection quality to a wireless network (2). The measurement system comprises a plurality of test devices (4 to 7, 24 to 27), the test devices (4 to 7, 24 to 27) each comprising a communication unit (8 to 11) configured to communicate with the wireless network (2) and a measurement unit (12 to 15) configured to measure the connection quality to the wireless network (2), a calibration controller (17, 37) configured to determine in a calibration mode the connection quality of each one of the test devices (4 to 7, 24 to 27) to the wireless network (2), and to calculate for every test devices (4 to 7, 24 to 27) an individual correction factor (18, 38) based on the connection quality determined during the calibration mode, and a signal adaption unit (19, 39) configured to adapt the measured connection quality of each one of the test devices (4 to 7, 24 to 27) according to the respective individual correction factor (18, 38).

15 Claims, 3 Drawing Sheets

(56) References Cited

U.S. PATENT DOCUMENTS

| | | | |
|---|---|---|---|
| 2014/0087668 A1* | 3/2014 | Mow | H04W 24/00 |
| | | | 455/67.14 |
| 2015/0023188 A1 | 1/2015 | Das et al. | |
| 2015/0109944 A1* | 4/2015 | Koike | H04J 11/005 |
| | | | 370/252 |
| 2015/0230109 A1 | 8/2015 | Socaciu et al. | |
| 2015/0244478 A1* | 8/2015 | Shirakata | H04B 17/309 |
| | | | 370/252 |
| 2017/0184698 A1* | 6/2017 | Rueth | G01R 35/007 |

* cited by examiner

US 10,057,790 B2

MEASUREMENT SYSTEM AND A METHOD

PRIORITY CLAIM

This application claims the benefit of European Patent Application No. 16181857.0, filed Jul. 29, 2016; the disclosure of which is incorporated herein by reference in its entirety.

TECHNICAL FIELD

The invention relates to a measurement system and a method for measuring a connection quality to a wireless network.

BACKGROUND

Although applicable to any system that uses wireless signals, the present invention will be described in combination with cell phone networks, like e.g. LTE networks.

Modern wireless communication networks comprise a plurality of network elements, like e.g. base stations and backbone devices, which connect the base stations to each other. The base stations can be thoroughly tested and evaluated at production time in the respective facility.

However, after installation of the base stations the surroundings of the base stations influence the signal transmission and reception of the base stations. Buildings, like houses and bridges, or any other object, like e.g. street signs and the like, can for example reflect or absorb the wireless signals.

Accordingly, there is a need for reliable field measurements in wireless networks.

SUMMARY

The present invention solves this problem with the features of the independent claims.

Therefore, a measurement system for measuring a connection quality to a wireless network comprises a plurality, i.e. two or more, of test devices, the test devices each comprising a communication unit configured to communicate with the wireless network, a measurement unit configured to measure the connection quality of the single test devices to the wireless network, a calibration controller configured to determine in a calibration mode the connection quality of each one of the test devices to the wireless network and to calculate for every test devices an individual correction factor based on the connection quality determined during the calibration mode, and a signal adaption unit configured to adapt the measured connection quality of each one of the test devices according to the respective individual correction factor.

A method for measuring a connection quality to a wireless network comprises measuring the connection quality to the wireless network with a plurality of test devices, determining in a calibration mode the connection quality of each one of the test devices to the wireless network, calculating for every test device an individual correction factor based on the connection quality determined during the calibration mode, and adapting the measured connection quality of each one of the test devices according to the respective individual correction factor.

The measurement system of the present invention comprises a plurality of test devices. The test devices can e.g. connect to the same wireless network, especially to a single base station of the wireless network. A wireless network in this context can be any network, which is provided by a single provider. A base station can be any network element that allows devices to connect wirelessly to the network. Since all the test devices connect to the same wireless network, and especially to the same base station, the test devices will perform parallel measurements.

Such a parallel measurement of the connection quality to the same wireless network yields a large amount of measurement data. This large amount of measurement data allows evaluating the connection quality to the wireless network in depth.

The single test devices, like e.g. smartphones, data sticks, RF scanners, or the like, can be provided in one location, e.g. a vehicle, a backpack, an office, or the like. However, in order to yield reproducible measurements, the single test devices should ideally be in the same position at the same time. Since this is not possible, the test devices will be near to each other but at slightly different positions during a quality measurement. This difference in position can lead to different radio frequency, RF, signal exposure of the single test devices and distortions of the measurement values. The different test devices in such a case will provide slightly deviating measurement values.

The present invention uses this knowledge and provides the calibration controller, which can determine the connection quality for each one of the test devices in a calibration mode.

Based on the difference in the connection quality of the single test devices in the calibration mode, the calibration controller will calculate an individual correction factor for every test device. The correction factor can e.g. be in the form of a real number. In normal operation mode, the correction factor is then e.g. multiplied with or added to the measurement value of the respective test device, e.g. by the signal adaption unit. The signal adaption unit can e.g. be a central unit in the measurement system, which receives the raw measurement values of the single test devices and applies the respective correction factors. However, the signal adaption unit can also be a distributed signal adaption unit, wherein a single signal adaptor is provided in every test device to apply the respective correction factor.

The calibration can be performed "in situ", i.e. with the real wireless network, which is to be tested. It is understood that as an alternative or in addition a calibration setup can be provided, where a base station of a provider is specifically provided to perform the calibration of the test arrangement.

With the help of the correction factor, the single measurement values of the test devices are mapped to a single position, as if the test devices where at the same position during the quality measurements. The correction factor therefore allows reducing the deviations of the measurement values of the single test devices.

Further embodiments of the present invention are subject of the further subclaims and of the following description, referring to the drawings.

In a possible embodiment, the calibration controller can be configured to record in the calibration mode measurement values of the connection quality of the test devices for a predetermined period of time, and the calibration controller can be configured to calculate for all test devices a combined baseline based on the recorded measurement values and a deviation from the baseline of the measurement values of the single test devices as a basis for the correction factor. The correction factor can e.g. be a value, which is later added to the measurement values of the single test devices. In this case, the deviation can directly be used as the correction factor. Alternatively, the correction factor can be multiplied with the measurement values of the single test devices. In this case, the correction factor for every test device can e.g. be calculated by dividing the baseline value by the respective measurement value.

In a possible embodiment, the calibration controller can be configured to calculate the baseline as an average value of all measurement values of all test devices and/or as a median value of all measurement values of all test devices and/or as a sum of all measurement values of all test devices and/or as an integral of all measurement values of all test devices. The calibration controller can especially calculate different baselines and compare or combine, e.g. by calculating the average or median value, the resulting correction factors.

During the predetermined period of time the test structure, i.e. the arrangement of the single test devices, can be moved, turned, elevated or the like, to provide measurement values for the test devices at different positions. This will improve the calculation of the average value.

In a possible embodiment, the calibration controller can be configured to record in the calibration mode together with the measurement values of the single test devices the positions and/or orientations of the single test devices, and the calibration controller can be configured to provide separate correction factors for the different positions and/or orientations. In the calibration mode, the test structure, i.e. the arrangement of the single test devices, can be moved, turned and the like, as explained above. RF signals can drastically change with only slight position changes. The calibration controller can consider this effect by providing the position and/or orientation dependent correction factors.

In a possible embodiment, the calibration controller can be configured to provide a new correction factor for a new position and/or orientation, if the new correction factor deviates from the last correction factor by more than a predetermined threshold value. The position and/or orientation dependent correction factors can be provided based on fixed position or orientation deltas, i.e. differences. However, this can lead to the provision of too many or not enough correction factors and therefore to an undesired deviation in the final measurement values. By providing the threshold factor for new correction factors, the deviation can be precisely limited.

In a possible embodiment, the measurement units can be configured to measure the connection quality based on RF parameters of a RF signal received from the wireless network and/or based on a quality correction factor, which is automatically calculated by the communication units, and/or based on Key Performance Indicators, KPI, of the wireless network and/or data tests and/or voice tests. The RF parameters can e.g. be parameters like the signal strength, the signal to noise ration and the like. The quality correction factor can be a factor, which is calculated automatically by the communication unit of the single test devices. Such quality correction factors can e.g. be provided for the RF circuitry of the communication unit and indicate attenuation or amplification factors and the like. The KPIs can comprise any combination of KPIs, which are defined for the respective wireless network. Just exemplarily for LTE networks, the following KPIs are defined:

Accessibility
  RRC Connection Establishment
  Random Access
  Initial E-RAB Establishment Success Rate
  RRC Connection Establishment Counters
  Initial E-RAB Establishment Success Rate Counters
  Added E-RAB Establishment Success Rate Counters
  Added E-RAB Establishment Success Rate
  S1 Signaling Connection Establishment
Retainability
  MME Initiated E-RAB & UE Context Release with counters Description
  UE Session Time
  RBS Initiated E-RAB & UE Context Release with counters Description
  MME & RBS Initiated UE Context Release Flow Chart
  MME & RBS Initiated E-RAB Release Flow Chart
Integrity
  EUTRAN Throughput KPIs
  EUTRAN Latency KPIs
  EUTRAN Packet Loss KPIs
Mobility
  X2 Based Handover Preparation & Execution
  Intra RBS Handover Preparation & Execution
  Intra Frequency Handover Preparation & Execution Counters
  S1 Based Handover Preparation & Execution
  Intra-frequency intra-LTE S1 & X2 Handover Flowchart
  Inter Frequency Handover Preparation & Execution Counters
  Inter-frequency intra-LTE S1 & X2 Handover Flowchart
Availability
  Partial cell availability (node restarts excluded)

Finally, data or voice tests can easily be performed e.g. by automated data rate measurements or voice quality detection measurements. For voice quality detection measurements, a standard sound, e.g. a sine sound wave, can be transmitted and the distortion in the received signal can be determined.

In a possible embodiment, the signal adaption unit can comprise for every test device an attenuation device, e.g. a housing, which is provided around the respective test device. In addition or as an alternative, the signal adaption unit can comprise for every test device an antenna attenuation device, which is provided in the antenna path of the respective test device. Further, in addition or as an alternative, the signal adaption unit can comprise a real time signal processor configured to apply the respective correction factor to the measurement values of the respective test device. In addition or as an alternative, the signal adaption unit can comprise a post measurement signal processer configured to apply the respective correction factor to the measurement values of the respective test device after the measurements have been performed by the test devices.

As can be seen, the signal adaption unit can comprise hardware or signal processing based modification means for adapting the measurement values of the single test devices accordingly. It is also possible to combine hardware based modification means with signal processing. The signal adaption unit can e.g. provide an attenuation device, which adapts the measurement signals of a test device according to a global baseline. The signal processing modification means can then be used to further adapt the measurement signals according the position and/or orientation of the respective test device, i.e. according to the position or orientation dependant correction factor.

In addition or as an alternative, one test device can be a golden unit, and the baseline can be determined based on the measurement values of the golden unit. A golden unit or golden device is an ideal example of a device against which all later devices are tested and judged. The term "golden" in this context is used to describe the precision of the device to standard specifications. Therefore, the golden unit can comprise pre-calibrated transceiver elements or the like. However, as an alternative to reduce the computational effort, any one of the test devices can be used as the golden unit.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

In the figures like reference signs denote like elements unless stated otherwise.

DETAILED DESCRIPTION OF THE DRAWINGS

Figure 1:
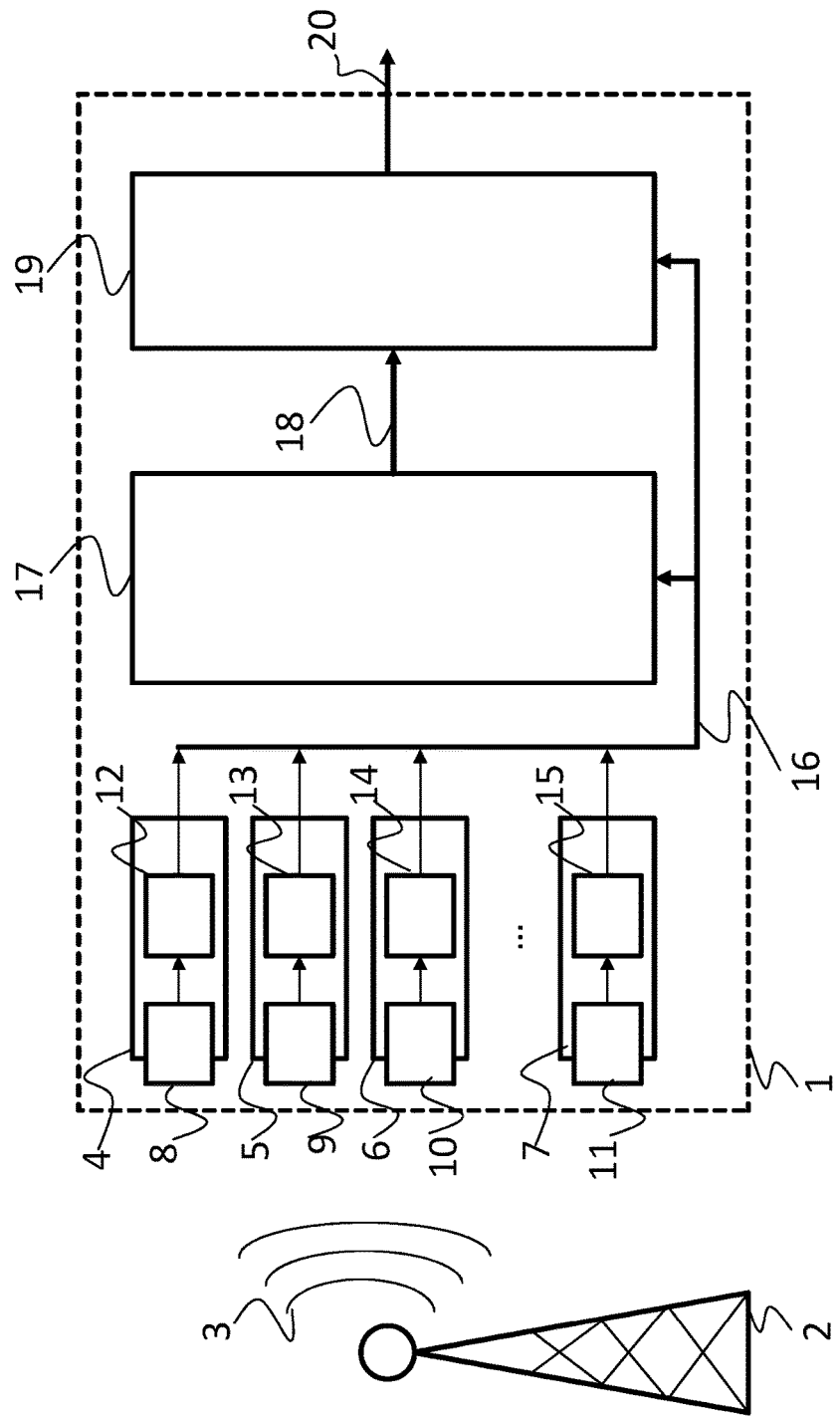
FIG. 1 shows a block diagram of an embodiment of a measurement system according to the present invention.

FIG. 1 shows a block diagram of an embodiment of a measurement system 1 for measuring the connection quality to the wireless network 2 via wireless signal 3.

The measurement system 1 comprises four test devices 4-7, wherein more test devices are hinted at by three dots. The number of four test devices 4-7 was chosen just exemplarily. Every test device 4-7 comprises a communication unit 8-11. The communication units 8-11 can e.g. be RF transceivers with respective controllers, which allow communication with the wireless network 2 and especially receiving the wireless signal 2. In the exemplary arrangement of FIG. 1, every test device 4-7 further comprises a measurement unit, which measures the connection quality of the respective test device 4-7 to the wireless network 2. It is to be understood, that alternatively a central measurement unit 12-15 can be provided for all test devices 4-7.

The measurement units 12-15 can e.g. use RF parameters of the communication units 8-11 to determine the connection quality. In addition or as an alternative, the measurement units 12-15 can e.g. use a quality correction factor, which is automatically calculated by the communication units 8-11. An alternate or additional source of information for calculating the connection quality can be the Key Performance Indicators, KPI, of the wireless network 2. Finally, data tests and/or voice tests can be performed to determine the connection quality.

In an uncalibrated state, because the single test devices 4-7 cannot be provided in the exact same location, the test devices 4-7 will provide slightly different quality measurements. This difference will even arise, if the test devices 4-7 are provided right next to each other.

To remove or at least reduce these differences, the measurement system 1 comprises a calibration controller 17, which in a calibration mode receives the measurement values from the measurement units 12-15. Based on the measurement values 16 the calibration controller 17 will calculate individual correction factors 18 for the single test devices 4-7. The calibration mode can e.g. be activated in the place, where the measurement will be performed, i.e. with the actual wireless network 2, which will be the subject under test in the normal operation mode. As an alternative or in addition, a specific calibration base station (not shown) can be provided for performing the calibration. In one embodiment, a basic calibration can be performed with the specific calibration base station and a further calibration or fine-tuning can be performed with the actual wireless network 2.

To determine the correction factors 18 the calibration controller 17 can e.g. calculate a baseline for all test devices 4-7 and calculate the deviation of the measurement values 16, e.g. of a respective mean measurement value, of the respective test device 4-7 from the baseline. This will be explained in more detail with reference to FIG. 2.

In a normal operating mode, the signal adaption unit 19 will combine the individual correction factors 18 with the measurement values 16 and provide calibrated measurement values 20 with reduced deviations due to location differences of the test devices 4-7.

The signal adaption unit 19 can have on of many forms. For example the signal adaption unit 19 can be a real time signal adaption unit 19, which modifies the wireless signal 3 or the measurement values 16 when they are received or generated, respectively. The signal adaption unit 19 can also be a post processing signal adaption unit 19, which can be applied to recorded measurement values 16. This allows easily comparing the measurement values 16 with the calibrated measurement values 20.

The signal adaption unit 19 can e.g. comprise an attenuation device like e.g. a housing, which wraps around the respective test device 4-7. An alternate signal adaption unit 19 is an antenna attenuation device, which lies in the antenna path of the respective test device 4-7 and attenuates the received wireless signal 3, when it is transported in the test device 4-7. Signal adaption units 19, which apply to the measurement values 16 can e.g. comprise a real time signal processor for applying the respective correction factor 18 while the measurement is performed, or a post measurement signal processor for applying the respective correction factor 18 after the measurements have been performed.

Figure 2:
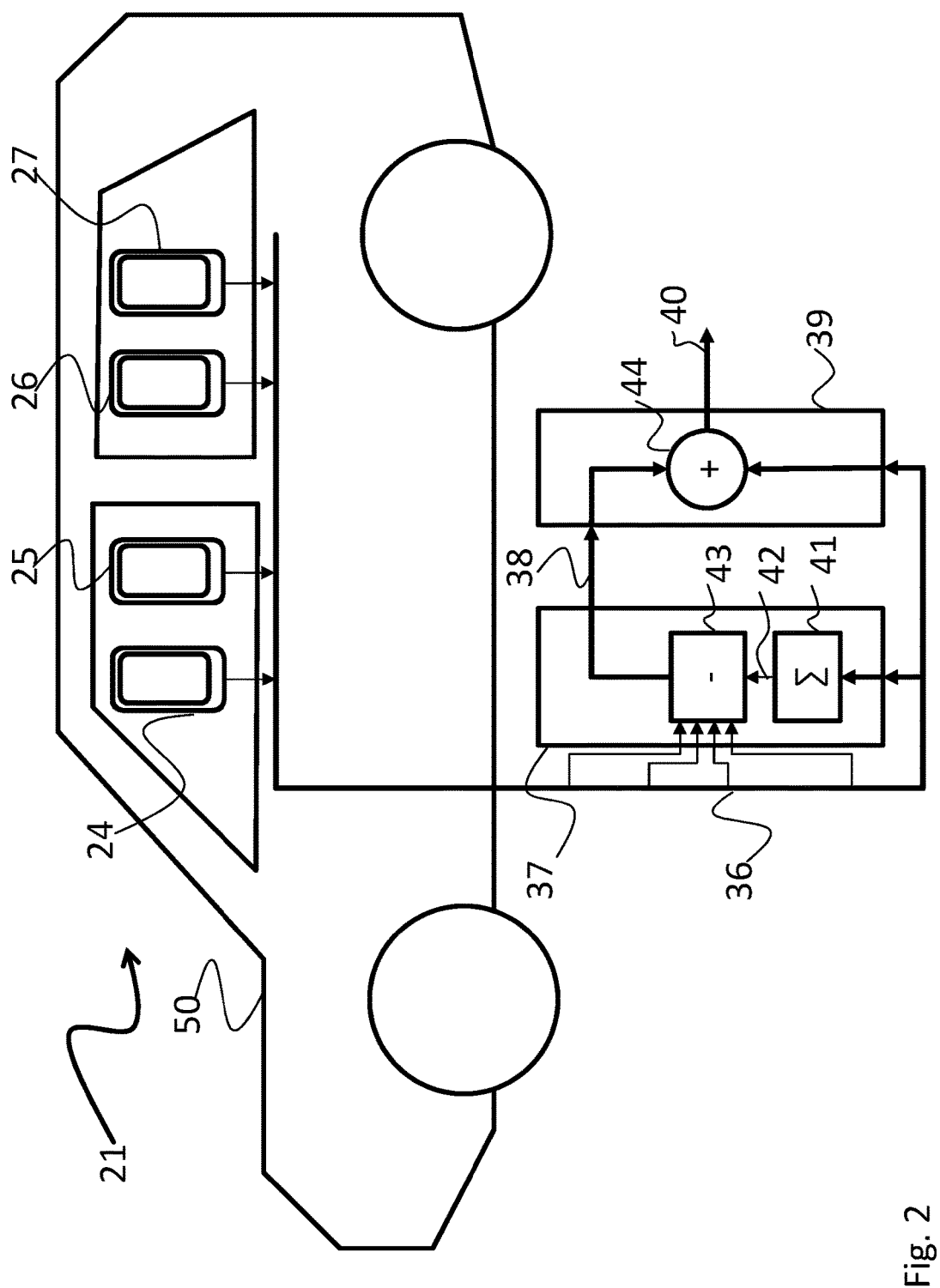
FIG. 2 shows a further block diagram of an embodiment of a measurement system according to the present invention.

FIG. 2 shows a further block diagram of an embodiment of a measurement system 21, which is based on the measurement system 1 of FIG. 1. Similar elements are provided with similar reference signs incremented by 20. Reference is made regarding these elements to FIG. 1. Further explanations of these elements will only be provided if necessary.

In FIG. 2 the test devices 24-27 are provided as smartphones in a vehicle 50, which is movable, i.e. non-static. A vehicle is shown in FIG. 2 just exemplarily. It is understood, that the test devices 24-27 can also be provided in a backpack, a box, a room or any adequate containment.

In FIG. 2 the calibration controller 37 and the signal adaption unit 39 are just schematically shown external to the vehicle 50. It is understood, that the calibration controller 37 and the signal adaption unit 39 can be provided in the vehicle 50, e.g. in the trunk.

The calibration controller 37 can e.g. record measurement values 36 for a predetermined period of time to provide a sufficient database for calculating the individual correction factors 38. Based on the recorded measurement values 36 the calibration controller 37 can then calculate a combined baseline 42 for all the test devices 24-27.

The deviation of the measurement values 36, e.g. of a respective mean value, of the single test devices 24-27 from the baseline 42 can then provide the basis for the individual correction factors 38.

There are several possible ways of calculating the baseline 42. The baseline 42 can e.g. be calculated as an average value of all measurement values 36 of all test devices 24-27, as a median value of all measurement values 36 of all test devices 24-27, as a sum of all measurement values 36 of all test devices 24-27, and as an integral of all measurement values 36 of all test devices 24-27. It is evident, that the measurement values 36 can be processed accordingly, to apply the baseline 42.

To improve the calibration results, the measurement system 21 can be moved while being in the calibration mode. This will expose the test devices 24-27 to different levels of the wireless signal at different positions. The baseline 42 will therefore be based on more and especially more diverse data.

In addition, the calibration controller 37 can record together with the measurement values 36 the positions and/or orientations of the single test devices 24-27. When calculating the correction factors 28, the calibration controller 37 can provide separate correction factors 38 for the different positions and/or orientations. The distance in time or space for providing a new correction factor 38 can be fixed. However, the calibration controller 37 can also provide a new correction factor 38 for a new position and/or orientation, if the new correction factor 38 deviates from the last correction factor 38 by more than a predetermined threshold value. This will reduce the amount of different correction factors to the necessary or desired minimum, which can be defined by the predetermined threshold value.

It is understood the measurement system 1, 21 can be implemented completely or at least in part in software or a computer program.

Figure 3:
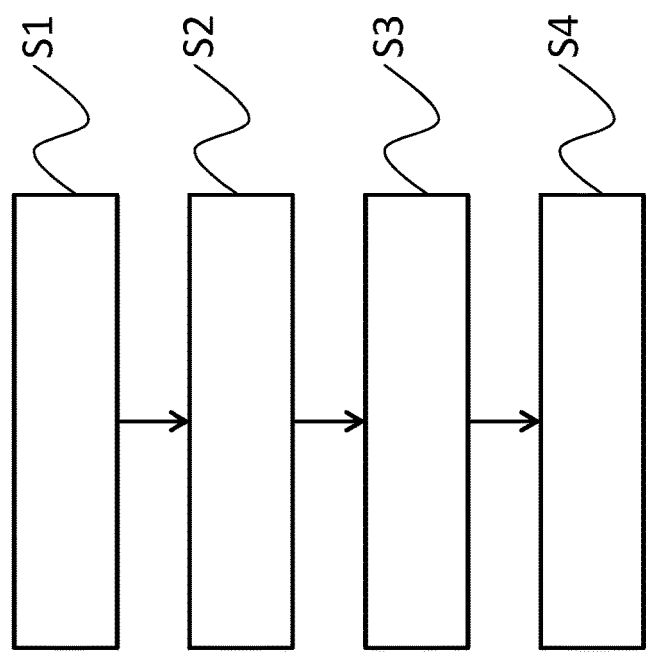
FIG. 3 shows a flow diagram of an embodiment of a method according to the present invention.

FIG. 3 shows a flow diagram of an embodiment of a method for measuring a connection quality to a wireless network 2.

The method comprises measuring S1 the connection quality to the wireless network 2 with a plurality of test devices 4-7, 24-27. The connection quality can be measured by the test devices 4-7, 24-27 based on RF parameters of a RF signal 3 received from the wireless network 2, based on a quality correction factor, which is automatically calculated by the communication units 8-11, based on Key Performance Indicators, KPI, of the wireless network 2, or data tests and/or voice tests.

In a calibration mode the connection quality of each one of the test devices 4-7, 24-27 to the wireless network 2 is determined, S2. Further, an individual correction factor 18, 38 is calculated, S3, for every test device 4-7, 24-27 based on the connection quality determined during the calibration mode. Finally, the measured connection quality of each one of the test devices 4-7, 24-27 is adapted, S4, according to the respective individual correction factor 18, 38.

For determining, S2, the connection quality in the calibration mode, measurement values 16, 36 of the connection quality of the test devices 4 to 7, 24 to 27 can be recorded for a predetermined period of time. Further, for all test devices 4-7, 24-27 a combined baseline 42 can be calculated based on the recorded measurement values 16, 36. The baseline 42 can be calculated as an average value of all measurement values 16, 36, as a median value of all measurement values 16, 36, as a sum of all measurement values 16, 36 of all test devices 4-7, 24-27, or as an integral of all measurement values 16, 36 of all test devices 4-7, 24-27. It is understood, that different baselines can be calculated and then be compared or combined. For example, the average or median of different baselines 42 can be calculated.

As an alternative, the baseline 42 can be determined based on the measurement values 16, 36 of a golden unit. One of the test devices 4-7, 24-27 can be the golden unit or an additional golden unit can be provided.

The deviation of the measurement values 16, 36 of the single test devices 4-7, 24-27 from the baseline 42 can then serve as a basis for calculating the correction factor 18, 38.

In the calibration mode together with the measurement values 16, 36 of the single test devices 4-7, 24-27 the positions and/or orientations of the single test devices 4-7, 24-27 can be recorded. These positions and/or orientations can be used to provide separate correction factors 18, 38 for the different positions and/or orientations. A new correction factor 18, 38 can e.g. provided for a new position and/or orientation, if the new correction factor 18, 38 deviates from the last correction factor 18, 38 by more than a predetermined threshold value.

For adapting, S4, the measured connection quality there exist several alternative or complementary possibilities. One is providing an attenuation device for every test device 4-7, 24-27, which is provided around the respective test device 4-7, 24-27. Another is providing an antenna attenuation device for every test device 4-7, 24-27, which is provided in the antenna path of the respective test device 4-7, 24-27. In addition the respective correction factor 18, 38 can be applied to the measurement values 16, 36 of the respective test device 4 to 7, 24 to 27 with real time signal processing. Finally, the respective correction factor 18, 38 can be applied to the measurement values 16, 36 of the respective test device 4 to 7, 24 to 27 after the measurements have been performed by the test devices 4 to 7, 24 to 27 in a post processing.

It is understood the method according to the present invention can be implemented completely or at least in part in software or a computer program, i.e. as a computer implemented method.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

List of reference signs

| | |
|---|---|
| 1, 21 | measurement system |
| 2 | wireless network |
| 3 | wireless signal |
| 4-7, 24-27 | test devices |
| 8-11 | communication unit |
| 12-15 | measurement unit |
| 16, 36 | measurement values |
| 17, 37 | calibration controller |
| 18, 38 | individual correction factors |
| 19, 39 | signal adaption unit |
| 20, 40 | calibrated measurement values |
| 41 | baseline calculator |
| 42 | baseline |
| 43 | correction factor calculator |
| 44 | value modifier |
| 50 | vehicle |
| S1-S4 | method steps |

The invention claimed is:

1. A measurement system for measuring a connection quality to a wireless network, the system comprising:
a plurality of test devices, the test devices each comprising a communication unit configured to communicate with the wireless network,
a measurement unit configured to measure the connection quality of the single test devices to the wireless network,
a calibration controller configured to determine in a calibration mode the connection quality of each one of the test devices to the wireless network, and to calculate for every test devices an individual correction factor based on the connection quality determined during the calibration mode, and
a signal adaption unit configured to adapt the measured connection quality of each one of the test devices according to the respective individual correction factor.

2. The measurement system according to claim 1, wherein the calibration controller is configured to record in the calibration mode measurement values of the connection quality of the test devices for a predetermined period of time, and wherein the calibration controller is configured to calculate for all test devices a combined baseline based on the recorded measurement values and a deviation from the baseline of the measurement values of the single test devices as a basis for the individual correction factor.

3. The measurement system according to claim 2, wherein the calibration controller is configured to calculate the baseline as an average value of all measurement values of all test devices and/or as a median value of all measurement values of all test devices and/or as a sum of all measurement values of all test devices and/or as an integral of all measurement values of all test devices.

4. The measurement system according to claim 1, wherein the calibration controller is configured to record in the calibration mode together with the measurement values of the single test devices the positions and/or orientations of the single test devices, and wherein the calibration controller is configured to provide separate correction factors for the different positions and/or orientations.

5. The measurement system according to claim 4, wherein the calibration controller is configured to provide a new correction factor for a new position and/or orientation, if the new correction factor deviates from the last correction factor by more than a predetermined threshold value.

6. The measurement system according to claim 1, wherein the measurement units are configured to measure the connection quality based on RF parameters of a RF signal received from the wireless network and/or based on a quality correction factor, which is automatically calculated by the communication units, and/or based on Key Performance Indicators, KPI, of the wireless network and/or data tests and/or voice tests.

7. The measurement system according to claim 1, wherein the signal adaption unit comprises for every test device an attenuation device, which is provided around the respective test device, and/or
wherein the signal adaption unit comprises for every test device an antenna attenuation device,
which is provided in the antenna path of the respective test device, and/or
wherein the signal adaption unit comprises a real time signal processor configured to apply the respective correction factor to the measurement values of the respective test device, and/or
wherein the signal adaption unit comprises a post measurement signal processor configured to apply the respective correction factor to the measurement values of the respective test device after the measurements have been performed by the test devices.

8. The measurement system according to claim 3,
wherein one test device is a golden unit, and the baseline is determined based on the measurement values of the golden unit.

9. A method for measuring a connection quality to a wireless network, the method comprising:
measuring, with a measurement unit of a measurement system, the connection quality to the wireless network with a plurality of test devices,
determining, by a calibration controller of the measurement system, the connection quality of each one of the test devices to the wireless network, wherein the calibration controller measures the connection quality while in a calibration mode,
calculating, by the calibration controller, for every test device, an individual correction factor based on the connection quality determined, by the calibration controller, during the calibration mode, and
adapting, by a signal adaption unit of the measurement system, the measured connection quality of each one of the test devices according to the respective individual correction factor.

10. The method according to claim 9, wherein determining the connection quality comprises:
recording, by the calibration controller in the calibration mode, measurement values of the connection quality of the test devices for a predetermined period of time, and calculating, by the calibration controller, for all test devices a combined baseline based on the recorded measurement values and a deviation from the baseline of the measurement values of the single test devices as a basis for the correction factor, wherein calculating the combined baseline comprises calculating the baseline:
as an average value of all measurement values of all test devices and/or
as a median value of all measurement values of all test devices and/or
as a sum of all measurement values of all test devices and/or
as an integral of all measurement values of all test devices.

11. The method according to claim 9, wherein calculating the correction factor comprises recording, by the calibration controller in the calibration mode, together with the measurement values of the single test devices, the positions and/or orientations of the single test devices, and providing separate correction factors for the different positions and/or orientations.

12. The method according to claim 11, further comprising providing, by the calibration controller, a new correction factor for a new position and/or orientation, if the new correction factor deviates from the last correction factor by more than a predetermined threshold value.

13. The method according to claim 9, wherein the connection quality is measured by the test devices based on RF parameters of a RF signal received from the wireless network and/or based on a quality correction factor, which is automatically calculated by the communication units, and/or based on Key Performance Indicators, KPI, of the wireless network and/or data tests and/or voice tests.

14. The method according to claim 9, wherein adapting the measured connection quality comprises:
providing, by the signal adaption unit, an attenuation device for every test device, which is provided around the respective test device, and/or providing, by the signal adaption unit, an antenna attenuation device for every test device, which is provided in the antenna path of the respective test device, and/or
applying, by a real time signal processor of the signal adaption unit, the respective correction factor to the measurement values of the respective test device, and/or
applying, a post measurement signal processer of the signal adaption unit, the respective correction factor to the measurement values of the respective test device after the measurements have been performed by the test devices in a post processing.

15. The method according to claim 10, wherein the baseline is determined based on the measurement values of a golden unit, wherein one test device is a golden unit.

* * * * *